3,555,453
STABILIZATION OF LASERS OR THE LIKE
Raphael M. Littauer, Ithaca, N.Y., assignor to
Lansing Research Corporation, Ithaca, N.Y.
Filed May 9, 1968, Ser. No. 727,889
Int. Cl. H01s *3/00;* H01v *7/00*
U.S. Cl. 331—94.5                                5 Claims

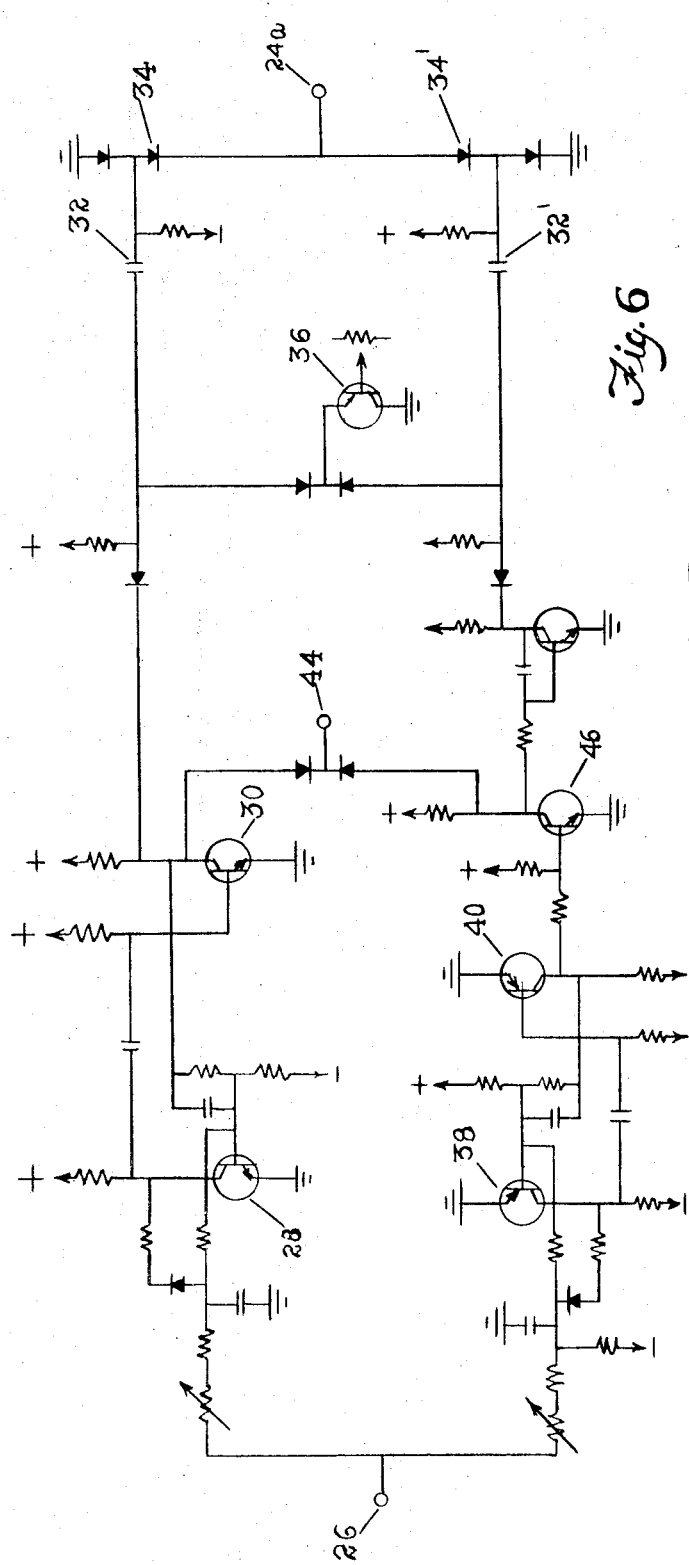
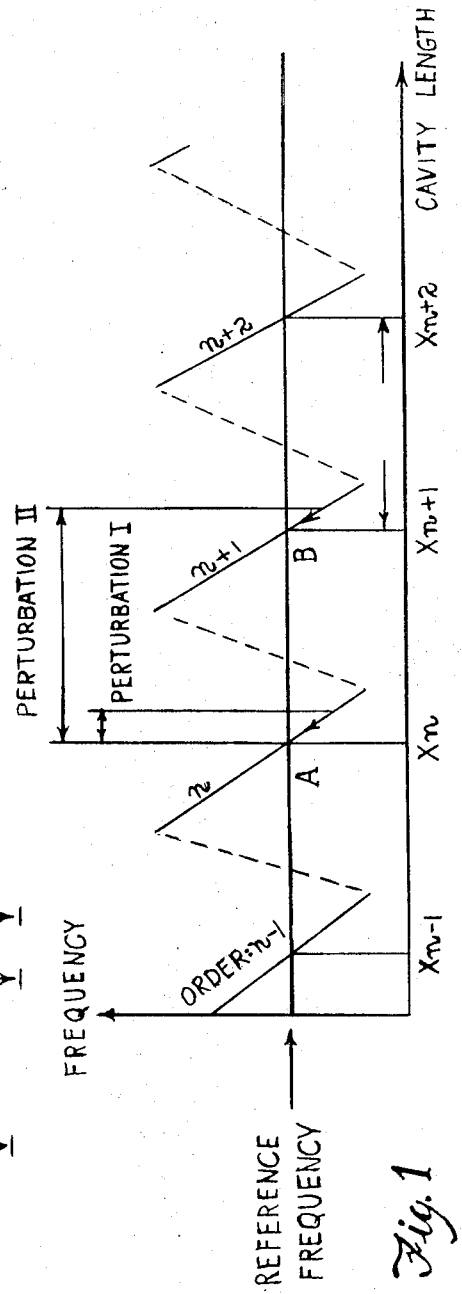
Fig. 6
Fig. 1
INVENTOR
RAPHAEL M. LITTAUER

ABSTRACT OF THE DISCLOSURE

A resonating device having frame end members between which a series of waves is reflected mounted on the frame, such as a laser, is provided with means responsive to relatively small variations in the length of the frame to apply voltage to a transducer which carries one of reflecting members so as to keep the spacing between the members constant at an integral multiple of one-half the wave length. Greater variations act to apply a different voltage to the transducer sufficient to cause it to shift the reflecting member by half a wave length or an integral number of half-wave lengths.

BACKGROUND OF THE INVENTION

(1) Field of the invention

The invention relates to an arrangement for stabilizing a laser or the like.

(2) The prior art

It is known that, when a series of waves are reflected back and forth between mirrors or the like carried by a frame, ambient temperature changes or the like can produce dimensional changes which result in frequency changes in the laser output. If the cavity is fitted with a transducer which permits the introduction of dimensional corrections, the laser frequency may be stabilized by refernece to some frequency standard. The transducer must be capable of enough fine control to permit adjustment on a scale small compared to the wave length of the laser; on the other hand, the dimensional changes encountered in typical cavities as a result of ambient drifts are often on the scale of very many wave lengths. This results in a design dilemma, wherein a sufficiently precise transducer may find itself unable to deliver the total travel required to offset the accumulated long-term drift of the cavity.

SUMMARY OF THE INVENTION

Some systems exhibit a multivalued behavior which offers a way out of this dilemma. For example, the cw laser can oscillate in any axial mode for which the cavity mirror-spacing is a multiple of the half-wave length, so that there are many adjacent orders for which the laser frequency is identical. The orders are separated by half-wave length increments in the cavity dimension and correspond to possible cavity lengths $Xn$.

A stabilizer operating with this system should hold the frequency to its reference value. This can be achieved by driving the transducer in such a manner as to bring the cavity length to one of the several possible values $Xn$. It becomes evident, now, that a total cavity drift $\Delta x$, possibly many wave lengths, can be handled by allowing the order to change appropriately, calling upon the transducer only for the final fine adjustment. In principle the total transducer travel requirement then never exceeds one-half wave length; in practice it is desirable to have some margin beyond this minimum.

The present proposal describes a method for introducing the required change in cavity order. Consider a sudden, step-like perturbation of cavity length introduced in the stabilizer: the system cannot respond with a correction instantaneously. Instead, the frequency deviates momentarily, returning to its stabilized value only after the feed-back loop has achieved equilibrium. Suppose (see FIG. 1) that the stabilizer is locked in at a given point A, and the sudden perturbation is of small amplitude: the stabilizer will then return to the same point A as it settles down (case I). If the perturbation is large (case II). the system will be taken into a different order during the transient, and will hereafter settle down at a different lock-in point B. Thus a change by a particular number of orders in a desired direction can be induced by a perturbation of step-like nature, with amplitude and polarity chosen approximately.

The long-term behavior of a stabilize incorporating this principle is described as follows: For small drifts, the system operates conventionally, with the transducer offsetting the drift directly. If the accumulated drift threatens to take the transducer beyond its range of travel, a limit-sensing device introduces the required step-like perturbation to induce a change of order, and the system continues to operate in the new order as long as this remains within the range of the transducer. Further order changes, in either direction, can be induced as required.

The operating frequency is unaffected by the order jump, except during the short time interval occupied by the transition itself and the settling time required thereafter. The transition can be made as short as the method for introducing the perturbation permits; the settling time can be reduced by making the amplitude of the step almost exactly right, so that the system is driven very close to its destined point of equilbrium. In any event, the order jumps will occur very rarely, being called for only as long-term drifts accumulate.

The step-like perturbation is most readily introduced through the transducer itself, although other methods may be available. In one possible system using the transducer itself, assuming that the system drift has called for the transducer voltage to be increasing cumulatively, bringing the transducer close to its limit of travel, the upper limit discriminator is triggered by the large transducer signal and calls for the "step down" circuit to produce a pulse. This pulse, of presettable amplitude, pumps a predetermined amount of charge directly into an integrator. This produces a rapid displacement of the integrator output, and hence of the transducer drive; with correct adjustment, the displacement will be such as to take the system into close vicinity of a new operating point, farther removed from the limits of travel. The charge is pumped into the integrator, through a pair of diodes, from a capacitor $C_2$. If the step-down circuit produces a pulse of amplitude $\Delta V$, the charge delivered will be about $C_2\Delta V$, and this will produce a step on the integrator output whose amplitude is $C_2\Delta V/C_1$, where $C_1$ is the integrating capacitor.

Similarly, if the system should drift towards the low end of the transducer range, the lower limit discriminator will fire, and the step-up circuit will produce a pulse. A charge $C_3\Delta V$, of opposite polarity to that previously considered, will be injected into the integrator, and a suitable upward step will be produced on the transducer. In practice, the capacitors might be made equal and $\Delta V$ adjusted in common for the two circuits so as to produce steps of appropriate amplitudes.

A refinement of the technique involves a switch, which is placed in series with the normal feed-back path which holds the system locked-in at the desired point. While a step of either polarity is being produced, this switch is opened momentarily. In this way, error signals developed during the step transient itself would not be admitted to the integrator, and thus any possible interference with the action of the step itself is avoided. After completion of the step, the switch is closed again and the system recaptures lock-in at its new operating point.

BRIEF DESCRIPTION OF THE DRAWINGS

In the drawings:
FIGS. 1 to 3 are explanatory diagrams;
FIGS. 5 and 6 are circuit diagrams.

DESCRIPTION OF THE PREFERRED EMBODIMENT

Referring to FIG. 1, assuming that the stabilizer is locked-in at a given point A, which can be for example the position of one of the mirrors, and there are perturbations of small amplitude, the known system will return the stabilizer to the point A. If however the perturbation is large, so as to tax the ability of the transducer to maintain the mirror at point A without subjecting it to excessively high voltage, the system of the present invention will change its order and will lock-in at a new point B which is one-half a wave length or an inegral multiple thereof from A. This mirror position will then be stabilized at this new point by the normal correcting system.

Figure 4A:
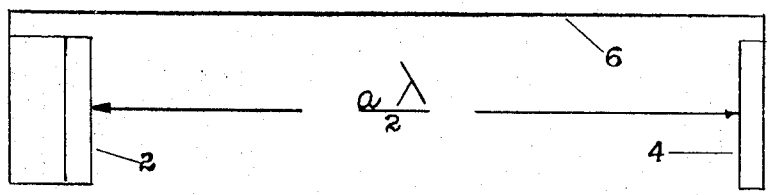
FIGS. 4A, 4B and 4C show schematically the operation of the invention.
Figure 4B:
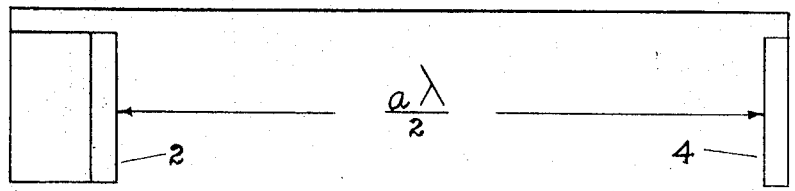
Figure 4C:
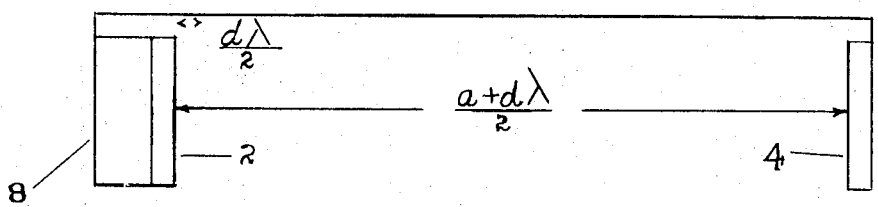

Referring to FIGS. 4A to 4C this same procedure is illustrated. These figures show schematically a pair of mirrors 2 and 4 held in a frame 6 in spaced relation to each other. It is desired to maintain the spacing between these mirrors as an integral multilple of a half wave length of the resonant wave. One of the mirrors is mounted on a transducer 8 which is supplied with voltage by a known system to be described in a general way herebelow. FIG. 4A shows the frame 6 holing the mirrors at a distance apart of an even multiple of half a wave length, that is a distance $$\frac{a\lambda}{2}$$

If now the frame 6 increases in length because of ambient temperature changes or for some other reason, the distance between the mirror mountings will change. The system referred to will then impose such a charge on transducer 8 as to cause it to expand to the degree necessary to shift mirror 2 so that its reflecting surface is maintained at the same distance from mirror 4 (FIG. 4B).

If now the change in length of frame 6 becomes so great as to require movement of the mirror surface by such a distance as to tax the transducer's ability to respond, the present system acts to impose such a voltage on the transducer as to cause it to change its dimension in the opposite direction, that is, in the example shown in FIG. 4C, to contract by an even multiple of one-half a wave length (for example by $\lambda/2$. This is represented in FIG. 4C as $$\frac{d\lambda}{2}$$

so that the distance between the mirrors remains an integral multiple of a half wave length, namely $$\frac{(a+d)\lambda}{2}$$

Figure 2:
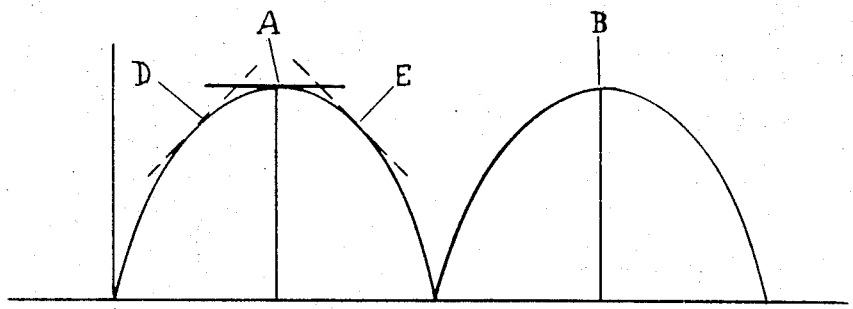

Referring now to FIG. 2, it is known that there are two frequency selective elements in every laser, the laser medium which exhibits gain over a frequency range centered about the optical transition frequency $\nu_0$, and the optical cavity which exhibits high Q modes at integer multiples of $C/2L$ where C is the phase velocity of light in the optical medium and L is the length of the optical resonator (operation in the fundamental resonator mode will be assumed throughout). In general, several resonator mode frequencies lie within the range of laser medium frequencies for which optical gain exceeds optical loss and the laser can oscillate. For inhomogeneously broadened optical transitions, such as Doppler broadening, the laser will oscillate simultaneously at each mode frequency for which the gain exceeds the loss. These simultaneous oscillations are not truly independent, since, through the action of optical saturation of gain around each oscillating mode, the modes can an do compete to stimulate the same atoms to emit. This competition tends to introduce amplitude instability in the independent oscillations. Another limitation in performance inherent in multi-mode operation is that the available power output is necessarily shared among the oscillating modes, no one of which will therefore oscillate with the maximum possible power output.

Since the Q of the optical resonator is typically much higher than the Q of the emission line, the frequency of the resonator mode determines the frequency of oscillation to first order. Second order corrections arise from dispersive effects in the optical medium and from "mode pushing". However, a resonator mode situated exactly at $\nu_0$ is essentially independent of these effects. This is the desired condition to be achieved by laser stabilization.

Referring to FIG. 2, the present system relies on the variation in laser power output which results from variation in the distance between the mirrors. The curve of FIG. 2 shows that the power is at a maximum at the points A, B and drops off on either side of such points. The known stabilizing systems operate by detecting the slope of the actual power output versus cavity length. For example, if the power output moves to points D or E, there will be a decrease from point A, but the slopes of the tangents at these points will be opposite to each other, dependent on whether the distance between the mirrors has increased or decreased.

Figure 3:
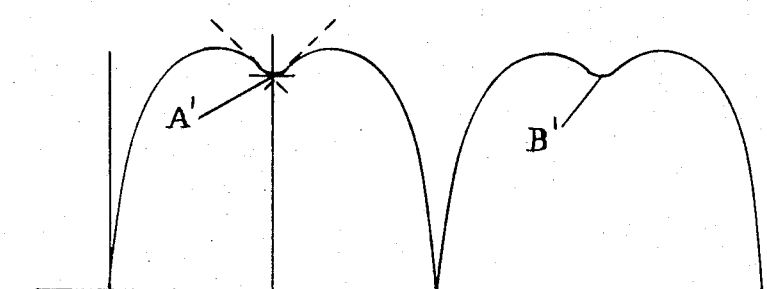

Referring now to FIG. 3, a modified mode of operation is shown.

When $C/2L$ exceeds the Doppler width, only one optical resonator mode can have enough gain to sustain oscillation. The laser power output will vary as shown in FIG. 3 when L is varied such that the resonator mode sweeps over the gain region. The dip in laser power at the optical transition frequency $\nu_0$ is clearly observable at relatively low laser power and for a single isotope of the atcive gas and is known as the Lamb or tuning dip. This is not present in all lasers.

A system for stabilizing to the bottom of the Lamb dip at the frequency $\nu_0$ is diagrammatically explained in FIG. 3. The position of one of the mirrors is sinusoidally modulated, thereby modulating the optical resonator length and optical resonator mode frequency. The laser output power is thereby sinusoidally modulated at the chosen modulation frequency with the following characteristics (for small modulation amplitude). The modulation index is zero when the mode frequency is $\nu_0$ since the slope of the laser power output with respect to $\nu$ is zero for $\nu=\nu_0$; the phase of the modulated component of the laser power relative to the modulative voltage is opposite for $\nu>\nu_0$ as compared to phase when $\nu<\nu_0$. The modulated component of the laser power is detected and amplified and then phase sensitively detected. The phase sensitively detected signal after filtering provides a discriminator signal that is zero for such resonator lengths that a resonator mode frequency is at $\nu_0$ and is positive on one side of $\nu_0$ and negative on the other side. This discriminator signal is D.C. amplified and is applied through a D.C. path with proper phase to constitute stable negative feedback. The result is to stabilize the resonator length so that oscillation occurs at $\nu_0$.

At the points A' and B', the laser is stabilized, while on either side of these points the power will have a slope of one direction or the other. The known system, for values of these slopes up to a given amount, uses a demodulator which receives a signal from a photocell which is sensitive to changes in the laser power. The demodulator which receives the signal from the photocell is phase-sensitive, and has a D.C. output which is proportional to the displacement from the zero slope point and a sign dependent on the side of the zero slope point. This is represented by the curve at the bottom of FIG. 3 which represents the output of the demodulator at various points of the power length curve.

Figure 5:
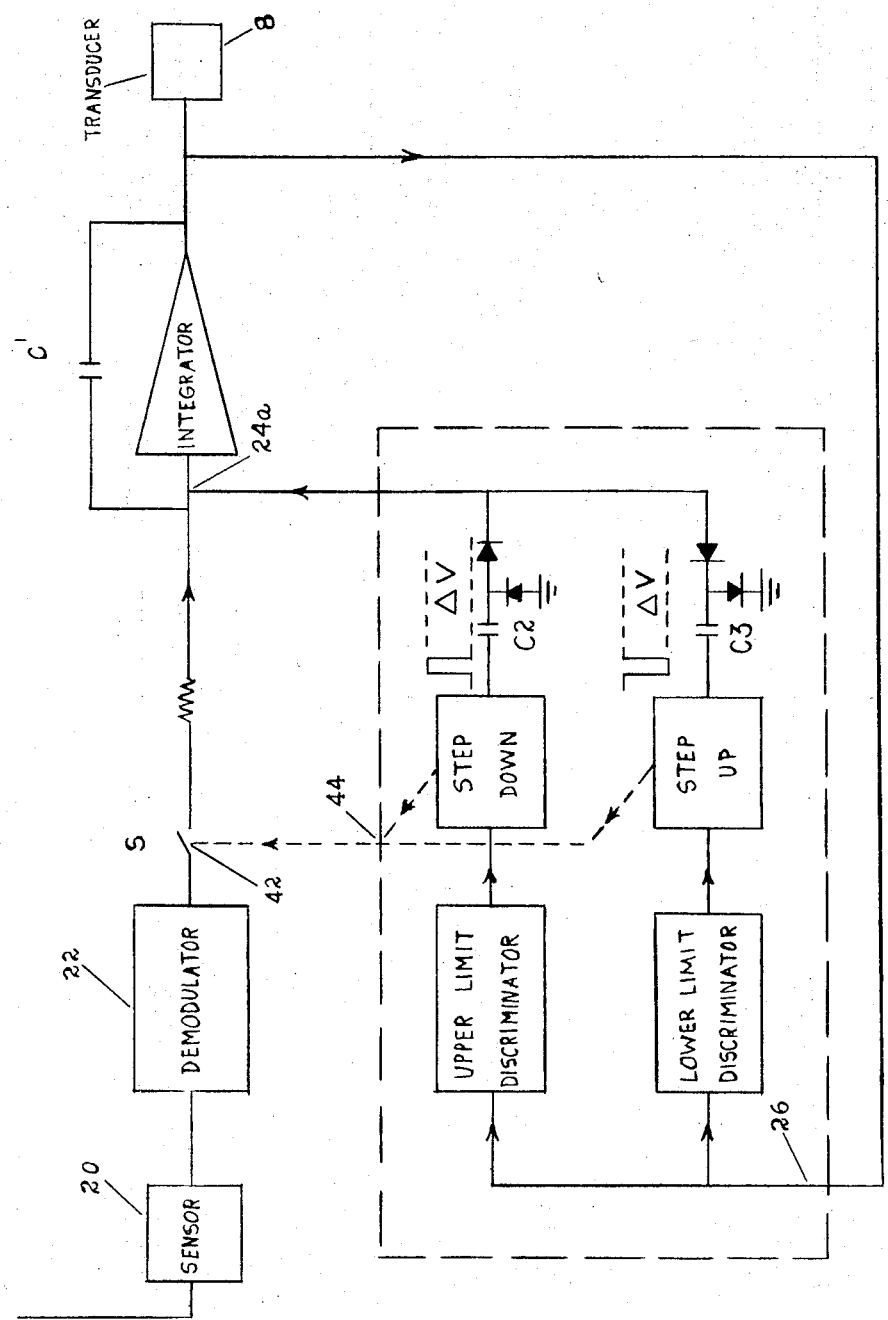

Referring now to FIG. 5, the sensor 20 and demodulator 22 normally feed a signal through integrator 24 to transducer 8 when there are deviations from the bottom of the Lamb dip so as to restore the distance between the mirrors to a multiple of a half wave length.

The essential part of the present invention is represented in FIG. 6, which is the portion of the circuit enclosed in broken lines in FIG. 5. The purpose of this circuit is to impose a voltage step on the transducer such as to produce a change in the position of the mirror of substantially one-half of a wave length, or an integral multiple thereof as is explained above in connection with FIG. 4.

The signal from integrator 24 is fed at 26 into the circuit of FIG. 6. These include an upper limit discriminator (step-down univibrator 28, 30) and a lower limit discriminator (step-up univibrator 38, 40). If the voltage at 26 (FIG. 6) exceeds a predetermined amount, transistor 28 conducts and flip-flops with transistor 30 to provide signals of a certain width. This pumps charge from capacitor 32 through diode 34 to the input 24a of integrator 24 and hence to the transducer. The condenser is recharged from ground when transistor 30 is on. The amount of charge is controlled by a potentiometer connected to transistor 36.

When the lower limit of transducer voltage is approached, transistor 38 is turned on and 40 off, and the pumping action is reversed, utilizing capacitor 32' and diode 34'.

A switch 42 in the circuit between the demodulator and the integrator is connected to the circuit of FIG. 6 at 44. This switch is controlled by transistors 30 and 40 (in the latter case through inverting transistor 46) to act on switch 42 to open it during the jump period.

The whole arrangement thus acts to maintain the distance between the mirrors at substantially an integral multiple of $\lambda/2$.

What is claimed is:

1. In combination with a resonating device having end members between which a series of waves is reflected having a wave length $\lambda$, a frame, and means mounting said members on said frame, at least one of said mounting means comprising a part which varies in at least one dimension in response to a supply of electrical energy thereto, said dimension being parallel to the portion of a line joining said members which is adjacent the member which is mounted on said part, first means responsive to small deviations of the distance between said members from a value $a\lambda/2$, where $a$ is an integer for supplying a relatively small electrical signal to said part to vary such dimension so as to maintain the distance between said members substantially constant, and second means responsive to larger deviations of the distance between said members from a value $a\lambda 2$ for supplying to said part a substantially greater electrical signal of short duration sufficient to vary such dimension by approximately an integral multiple of $\lambda/2$, whereby to keep the electrical energy supplied to said part within operating limits.

2. A device as claimed in claim 1 in which said resonating device is a laser cavity.

3. In a device as claimed in claim 1, means responsive to the operation of said second responsive means to render said first responsive means inoperable.

4. A device as claimed in claim 1, in which said resonating means is a laser cavity, and in which said part is a transducer.

5. A device as claimed in claim 4, means responsive to the operation of said second responsive means to render said first responsive means inoperable.

References Cited

UNITED STATES PATENTS

| | | | |
|---|---|---|---|
| 3,257,562 | 6/1966 | Erdman et al. | 365—95 |
| 3,431,514 | 3/1969 | Oshman et al. | 331—94.5 |
| 3,443,130 | 5/1969 | Shoh | 310—8.1 |
| 3,471,803 | 10/1969 | Forster | 331—94.5 |
| 3,474,268 | 10/1969 | Rudnick | 310—8.1 |

RONALD L. WIBERT, Primary Examiner

V. P. McGRAW, Assistant Examiner

U.S. Cl. X.R.

310—8.1